United States Patent [19]

Hagar

[11] 4,273,365
[45] Jun. 16, 1981

[54] EXPANSION JOINT AND FABRIC THEREFOR

[76] Inventor: Donald K. Hagar, 2439 Walnut St., Allentown, Pa. 18104

[21] Appl. No.: 40,736

[22] Filed: May 18, 1979

[51] Int. Cl.³ .............................................. F16L 51/02
[52] U.S. Cl. ................................... 285/229; 428/133; 428/236; 428/251
[58] Field of Search ............... 285/229, 236, 235, 226, 285/227, 228; 428/236, 251, 133, 132

[56] References Cited

U.S. PATENT DOCUMENTS

| | | |
|---|---|---|
| 2,012,108 | 8/1935 | Raney . |
| 2,068,533 | 1/1937 | Coffman . |
| 2,561,891 | 7/1951 | Tucker . |
| 2,703,772 | 3/1955 | Keithly . |
| 2,847,086 | 8/1958 | Muller .............................. 428/133 X |
| 3,109,670 | 11/1963 | Engel . |
| 3,183,022 | 5/1965 | Sayag . |
| 3,203,849 | 8/1965 | Katz et al. . |
| 3,315,704 | 4/1967 | Shire . |
| 3,413,180 | 11/1968 | Smith . |
| 3,460,856 | 8/1969 | Van Tine et al. ....................... 285/53 |
| 3,522,074 | 7/1970 | Kalleberg et al. . |
| 3,558,423 | 1/1971 | Rossetti, Jr. ........................... 428/251 |
| 3,654,966 | 4/1972 | Waksman . |
| 3,655,224 | 4/1972 | Carberry et al. . |
| 3,768,842 | 10/1973 | Ahlstone ................................ 285/55 |
| 3,769,146 | 10/1973 | Ravel . |
| 3,808,087 | 4/1974 | Milewski et al. . |
| 3,916,954 | 11/1975 | Hochhausen . |
| 3,935,355 | 1/1976 | Kuhn . |
| 4,025,680 | 5/1977 | Botsolas et al. . |
| 4,063,755 | 12/1977 | Merz ................................. 285/236 X |

FOREIGN PATENT DOCUMENTS

2408885  9/1975  Fed. Rep. of Germany ........... 285/229
555415  8/1943  United Kingdom ..................... 428/133

Primary Examiner—Thomas F. Callaghan
Attorney, Agent, or Firm—Schwartz, Jeffery, Schwaab, Mack, Blumenthal & Koch

[57] ABSTRACT

An expansion joint and a fabric which may be used in connection therewith are disclosed. The expansion joint and fabric are particularly suitable for joining conduit sections through which high temperature, highly corrosive gases are conveyed, such as flue gases in a power plant. The fabric material includes a pair of foil-fabric composites in which a metallic foil is bonded to a high temperature resistant material, such as glass cloth. Between the two foil-fabric composites is a fluid impervious barrier preferably comprising an inner metallic foil of alloy material. The foil-fabric composites are stiffer than the high temperature resistant material alone, and this limits the motion and flexibility of the expansion joint to such an extent that the inner foil is not crumpled and damaged during use and handling. At the same time the stiffening is not so great that the ability of the expansion joint to accommodate relative movement between conduit sections is substantially affected. One of the foils bonded to one of the layers of high temperature resistant material eliminates the need for an internal, rigid erosion shield in the expansion joint by providing sufficient protection against impingement on the fabric of hot, dirty gases containing high amounts of particulate matter. The other foil bonded to the other layer of high temperature resistant material protects against damage to the expansion joint material from the outside.

30 Claims, 11 Drawing Figures

FIG. 11

EXPANSION JOINT AND FABRIC THEREFOR

BACKGROUND OF THE INVENTION

1. Field of the Invention

The present invention generally relates to expansion joints for use in coupling conduits that are utilized in conveying gaseous fluids at high temperatures.

2. Description of the Prior Art

In certain conduit installations, it is often desirable to utilize a joint structure for coupling conduit sections together so that lateral or longitudinal movements of the conduits may be effectively accommodated. Such joints are typically known as expansion joints and absorb expansion and contraction movements when vibrations and other relative movements are imparted to the coupled conduits during fluid flow therethrough. Expansion joints have heretofore been proposed in many configurations, such as sheet metal bellows having one or more annular bulges, tubular sleeves and multilayered laminates of various insulating materials.

To be effective, an expansion joint must be capable of accommodating both longitudinal and lateral movements of the coupled conduits, including severe vibrations and other irregular movements. Further, since an expansion joint is often utilized in high temperature applications, it is important that the joint be capable of maintaining its physical integrity in such environments. It is also highly desirable that an expansion joint be capable of resisting the corrosive action of chemicals and providing effective sealing against leaking of gaseous fluids under all anticipated operating conditions.

To provide the foregoing desirable characteristics, an expansion joint has been used which includes a flexible fabric portion bridging the space between the conduit sections and which includes a pair of high temperature resistant fabric layers, such as woven fiberglass cloth, and a foil of super-alloy metal disposed between the two cloth layers. Such a construction is disclosed in applicant's copending application Ser. No. 932,613 filed Aug. 10, 1978.

While the construction as disclosed in the foregoing copending application is effective for the purposes intended, it has been found that the super-alloy foil may become creased, wrinkled or crumpled during handling, installation or disassembly or when the joint otherwise is subject to greater deflections than it would undergo during normal use. This in turn, results in rupture of the foil and loss of its sealing effect. Also, because the foil is not visible, rupture thereof is difficult to detect.

Another drawback in known expansion joints stems from use of erosion shields or liners used in conjunction with the joint. Such a shield or liner is shown in one of the embodiments in applicant's foregoing copending application. The erosion shield or liner protects the fabric component of the expansion joint against constant impingement of hot, dirty gases flowing at high velocity and containing high amounts of particulate matter. During flexure of the expansion joint, folding of the flexible fabric material takes place and pockets are formed between the erosion shield and the fabric material. In power plant applications, in particular, this pocket tends to become filled with ash and soot. When the expansion joint returns to its undeflected position, the ash or soot becomes packed between the flexible fabric material and the erosion shield, and this tends to tear and damage the flexible material of the fabric joint. If the expansion joint is of the type disclosed in applicant's foregoing copending application, the internal foil will also be damaged.

SUMMARY

It is a general object of the present invention to overcome the above-described drawbacks of known expansion joints.

It is another object of the present invention to provide an expansion joint which has the advantages of the expansion joint described in applicant's copending application Ser. No. 932,613 filed Aug. 10, 1978 while overcoming certain drawbacks thereof.

More particularly, it is an object of the present invention to provide an expansion joint which is very flexible and may accommodate substantial relative movements between conduit sections, which maintains its strength and physical integrity in high temperature environments, which resists corrosive action of chemicals in hot, dirty gases such as flue gases, and which provides an effective seal against leakage of gaseous fluids, while at the same time also resisting damage due to creasing of the foil and collection of ash and soot between the fabric of the expansion joint and an erosion shield thereof.

It is another object of the present invention to provide an expansion joint which resists damage from the exterior thereof such as through accidental impact of objects with the expansion joint or mistreatment.

It is another object of the present invention to eliminate the need for the usual rigid erosion shield in an expansion joint having a fabric portion.

It is yet another object of the invention to achieve the foregoing objects with a device which is very simple in construction and economical to manufacture.

These and other objects and advantages will be apparent from the following description and from the drawings.

The objects of the present invention are achieved through use of a flexible fabric material having a first layer of flexible high temperature resistant material, such as woven fiberglass cloth, and first metallic foil affixed to the first layer to provide a first foil-fabric composite. Also included is a second layer of flexible high temperature resistant material and a second metallic foil affixed to the second layer to provide a second foil-fabric composite. The first and second foil-fabric layers are disposed in adjacent, parallel relationship. A third layer of metallic foil is disposed between the first and second foil-fabric composites, the major portion of the surface area of the third foil layer being unaffixed to the first and second foil-fabric composites. Such a fabric material is used as a portion of an expansion joint for accommodating vibrations and relative movements between a plurality of elements through which a fluid flows. The expansion joint includes a first means for effecting attachment of the flexible fabric portion to one of the elements through which the fluid flows and second means for effecting attachment of the flexible fabric portion to another of the elements through which the fluid flows. The fabric portion extends between the first and second attachment means, and, of course, defines an enclosed space through which fluid may flow.

The affixing of a particular type of foil to the high temperature resistant material contributes importantly to achieving the objects of the present invention. The affixed foil, in part, serves as a means, coupled with at least one of the layers of high temperature resistant material, for partially stiffening the same to such an extent that accommodation of relative movement between the plurality of elements is not substantially affected but such that creasing or crumpling of the first and second layers of high temperature resistant material and thus of the metallic foil therebetween is prevented.

The first and second metallic foils which are affixed to the high temperature resistant material have a thickness greater than 0.0005 inches, and preferably have a thickness falling in the range of 0.001 to 0.003 inches. These two metallic foils have a hardness in the range of 15–25 on the Rockwell C scale.

The first of the aforementioned foil-fabric composites is so disposed that the first metallic foil faces inwardly with respect to the passage defined by the fabric portion. The second foil-fabric composite is so disposed that the second metallic foil faces outwardly with respect to the foregoing passage. Stated differently, the first and second foil-fabric composites are so disposed that the first and second metallic foils thereof face outwardly of each other in opposite directions and such that the first and second layers of high temperature resistant material are disposed between the first and second metallic foils.

The first and second metallic foils may be affixed, respectively, to the first and second temperature resistant materials by adhesive. Alternatively, the first and second metallic foils may be affixed, respectively, by whiskers punched into the foil and extending into the interstices of the woven fiberglass cloth comprising the temperature resistant material of each layer.

The first, second and third metallic foils comprise a super-alloy metal having more than approximately 50% nickel and including chromium. An additional layer of material may be disposed outwardly of the second metallic foil of the second foil-fabric composite for additional protection and insulation.

DETAILED DESCRIPTION OF THE PREFERRED EMBODIMENT

In the following description, and in the drawing, like reference characters are used among the various figures of the drawing to indicate like elements or features.

Figure 1:
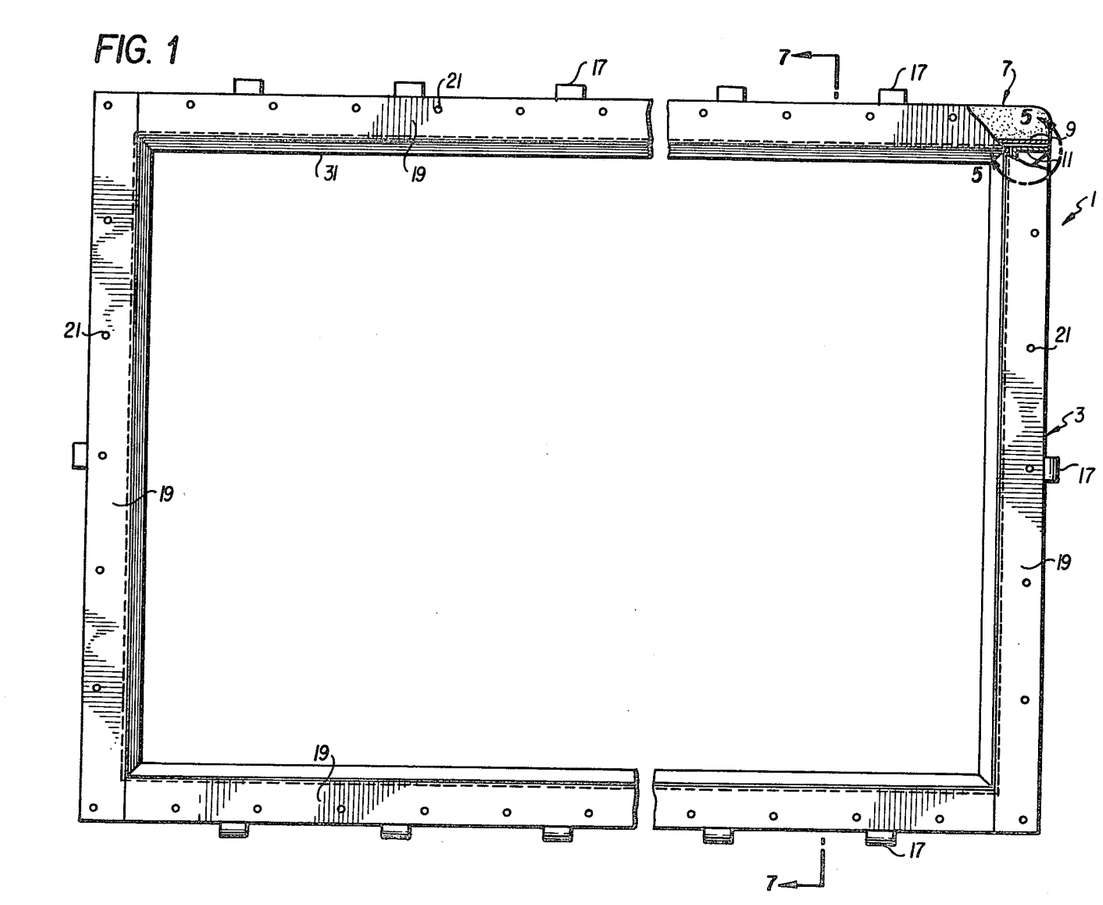
FIG. 1 is an elevational view taken from the exit end of an expansion joint according to the invention.
Figure 2:
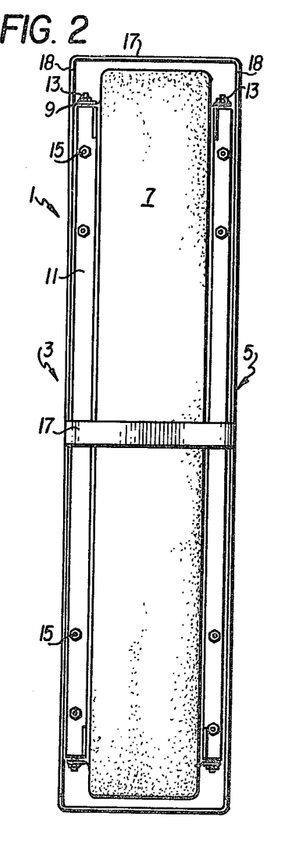
FIG. 2 is a side view of the expansion joint shown in FIG. 1.

An expansion joint 1 according to the invention is shown in FIGS. 1 and 2. Expansion joint 1 includes a pair of spaced frame section 3 and 5 having corresponding, generally rectangular configurations. Sections 3 and 5 are bridged or joined together by a fabric portion, generally referred to by reference numeral 7, which encircles the inner peripheral edges of sections 3 and 5 and is secured thereto by a plurality of first retainer strips 9 and a plurality of second retainer strips 11. Fabric portion 7 defines an internal, enclosed passageway 12 (FIG. 7) through which gaseous fluid may flow. The direction of fluid flow through passageway 12 is shown by arrow F of FIG. 7. Strips 9 are detachably secured to frame sections 3 and 5 by a plurality of bolt assemblies 13. Similarly, strips 11 are detachably secured to frame sections 3 and 5 through a plurality of bolt assemblies 15.

Expansion joint 1 may also be provided with a plurality of U-shaped bars 17 welded to the outer peripheral edges of frame sections 3 and 5, as indicated at 18 in FIG. 2. Bars 17 are utilized for presetting and aligning joint 1 during its coupling to the associated conduits or ducts and serve to provide overall rigidity to the expansion joint since fabric portion 7 is flexible. After installation, bars 17 are removed by undoing welds 18. This permits joint 1 to expand, contract or otherwise flex through fabric portion 7.

Figure 3:
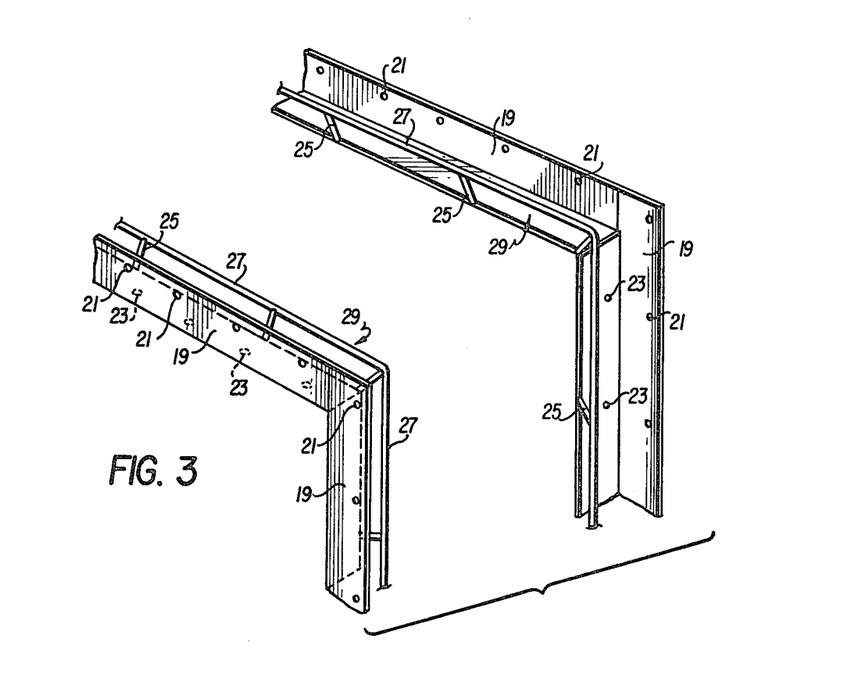
FIG. 3 is a fragmentary perspective view of the frame sections of the expansion joint shown in FIG. 1.

Referring to FIG. 3, frame sections 3 and 5 are each preferably constructed from four metal right angle sections 19 secured together at corresponding corners by welding or the like. The outer faces of sections 19 are provided with a plurality of apertures 21 for connection to adjacent ends of the conduits or ducts to be coupled as shall be hereinafter described. The inner portions of sections 19 are provided with apertures 23 for securing retainers 9 and 11 thereto.

Frame sections 3 and 5 each include a plurality of inwardly directed struts 25 made from short sections of round metal bar stock or the like, with each strut 25 having one end welded to an inner peripheral edge of section 19. A plurality of support rods 27 are secured to the free ends of struts 25, such as by welding or the like, to define a pair of substantially rectangular-shaped support frames 29 on frame sections 3 and 5.

Figure 4:
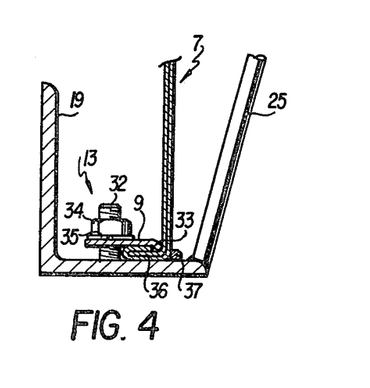
FIG. 4 is an enlarged fragmentary cross-sectional view of one means for retaining an edge of the fabric assembly to a frame section.

The manner in which fabric portion 7 is secured to frame sections 3 and 5 shall now be described with reference to FIGS. 4 and 5. Angle section 19 defining one upper horizontal portion of frame section 3 or 5 includes a stud 32 which is threadedly received within aperture 23, the latter also provided with corresponding female threading. Retainer 9, in the form of an elongated rectangular strip having a downwardly turned lip portion 33 along one longitudinal edge thereof, is provided with a plurality of corresponding apertures (not shown) which fit over a plurality of studs 32. By tightening a plurality of nuts 34 and corresponding flat washers 35 downwardly on studs 32, lip 33 of retainer 9 is caused to overlap a folded peripheral edge 36 of fabric portion 7. This serves to securely retain edge 36 against angle section 19. A round metal rod 37 may be secured to angle section 19, such as by welding, to provide an abutment against which lip 33 presses edge 36 to provide an even more effective and secure sealing of fabric portion 7 to frame sections 3 and 5.

Figure 5:
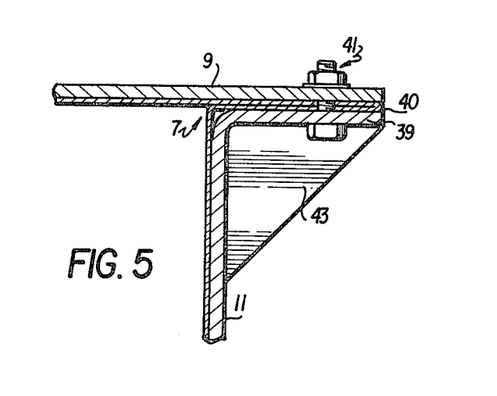
FIG. 5 is an enlarged cross-sectional view encircled by line 5—5 of FIG. 1.

As depicted in FIG. 5, each end of retainer 9 is secured to an outwardly turned flange portion 39 provided at the opposite ends of each retainer 11 by means of a nut and bolt assembly 41. As also shown, a portion of fabric portion 7 is folded to form a "bloused" fabric corner 40 that is clamped between retainer 9 and 11 through bolt assembly 41. This manner of folding fabric portion 7 provides important stress relief at corner portions thereof and prevents rupturing of fabric portion 7 during use at these high stress locations. As seen in FIG. 5, folded fabric corner 40 extends outwardly from the general perimeter of frame section 3. This configuration is the same for all such corners 40 and distinguishes from known techniques for securing bellows assemblies to a frame wherein such assemblies basically conform entirely to the perimeter of the frame.

Retainer 11 is essentially in the form of a flat strip that may be secured against the inwardly directed portions of angle sections 19 defining the sides of frame sections 3 and 5 for pressing the vertical edges of fabric portion 7 thereagainst. This is achieved through bolt assemblies (not shown) which are similar to bolt assemblies 13 previously described for securing retainers 9. A reinforcing plate 43 may be disposed at each end of retainer 11 to impart additional strength to the joint structure held together by bolt assembly 41.

Figure 6:
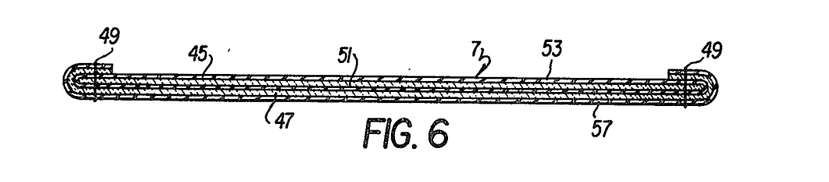
FIG. 6 is a cross-sectional view depicting the construction of the flexible fabric portion utilized in the invention.

The structural configuration of fabric portion 7 is generally shown in FIG. 6. As shown therein, fabric portion 7 includes a first layer of heat resistant material 45 secured to a second layer of heat resistant material 47 by folding and stitching the longitudinal edges of layer 47 against layer 45, as shown at 49. A thin barrier of fluid impervious material in the form of a metallic inner foil 51 is disposed between layers 45 and 47. Layers 45 and 47 are preferably woven from high heat resistant material, such as fiberglass or the like, so that fabric portion 7 may retain approximately 50% of its tensile strength at around 700° F. and is suitable for withstanding high operating temperatures of around 800° F. and higher. Because of the preferred woven nature of layers 45 and 47, only two relatively thin plies of this material are required to provide the necessary physical strength and integrity under adverse operating conditions. Fabric portion 7 may be in the form of a long rectangular strip having its end edges joined by stitching or, alternatively, may be in the form of a continuous loop.

Thin metal foil barrier 51 is most advantageously of super alloy metal such as Inconel 600, Inconel 625, Haselloy C-276, or the like, with such alloys being well known for their high corrosion resistance. These alloys are typically of more than about fifty percent nickel, with chromium being another major alloying constituent. Barrier 51 is preferably on the order of 0.5–1.5 thousandths of an inch thick, is completely impervious to fluid flow therethrough and has high resistance to chemical attack.

Affixed to that side of first outer layer 45 which is furthest from and faces away from foil 51 is an additional metallic foil 53. Foil 53 and the first layer 45 of heat resistant material together form a first foil-fabric composite 55 (see FIGS. 8, 9 and 11). Similarly, a foil 57 is affixed to that side of second outer layer 47 of heat resistant material which is furthest from and faces away from barrier 51. Foil 57 and the second layer 47 of heat resistant material together form a second foil-fabric composite 59.

First foil-fabric composite 55 is so disposed that foil 53 faces inwardly with respect to passage 12 defined by fabric portion 7. Second foil-fabric composite 59 is so disposed that foil 57 faces outwardly with respect to passage 12. The first and second foil-fabric composites 55, 59 are so disposed that foils 53, 57 thereof face outwardly of each other in opposite directions and such that the first and second layers 45, 47 of heat resistant material are disposed between foils 53, 57.

Foils 53, 57 are of at least such thickness as to be capable of being manufactured as separate, integral pieces and of being handled without damage. In other words, foils 53, 57 are of a completely different order of magnitude in thickness than typical metal coatings or layers which are not normally produced as separate integral pieces, for example, vapor deposited metal layers. In this regard, foils 53, 57 will have thicknesses greater than 0.0005 inches. For optimum performance, however, the thicknesses of foils 53, 57 will be in the range of 0.001 to 0.003 inches.

By bonding foils 53, 57 to layers 45, 47 of heat resistant material, a construction results in which the overall motion of the expansion joint 1 and, in particular, the fabric portion 7 thereof is restrained and limited to such an extent that the inner barrier or foil 51 does not become crumpled or creased due to excessive movement or deflection of fabric portion 7. It has been found that crumpling, creasing or wrinkling of the inner foil 51 tends to result in permanent damage to the foil. That is, foil 51 becomes ruptured either immediately, if the creasing or wrinkling has been severe enough, or eventually, after the foil continues to flex in the same creases and wrinkles. The creasing and wrinkling problem, which results in rupture of the inner foil 51, is most prevalent where the expansion joint has been handled in such a way as to create excessive displacements between sections of the joint or where some exterior force or impact has been involved. Since delicate handling and freedom from outside forces cannot be counted upon, protection against crumpling, creasing or wrinkling of the inner foil 51 is very important.

It will be appreciated from the foregoing that the outer foils 53, 57 impart a stiffening effect to layers 45, 47 of heat resistant material such that creasing of the inner foil 51, and thus rupture thereof, is prevented. Of course, however, the purpose of the expansion joint 1 is to allow freedom of movement between a plurality of elements through which fluid flows, and thus the expansion joint must remain flexible. The use of foils 53, 55 as provided herein and the affixing of such foils to the layers 45, 47 of heat resistant material provides optimum flexure characteristics of the expansion joint such that the ability of the joint to accommodate relative movement between two elements, such as two conduits, through which fluid flows is not substantially affected during normal use, but such that the aforementioned creasing and rupture is prevented.

The type of material used for foils 53, 57 contributes importantly to the performance of the expansion joint. To allow for sufficient flexibility, foils 53, 57 must be relatively thin, within the limits discussed above, to allow a freedom of movement during normal operating conditions which is similar to that provided by a material such as a woven fabric cloth alone. By the same token, foils 53, 57 must impart a proper degree of stiffness to the overall fabric portion 7 of the expansion joint to resist abnormal movements. Also, the foils 53, 57 must have a high tensile strength to withstand the forces imparted to the expansion joint in use. For these reasons, foils constructed primarily of the softer, less strong metals such as aluminum would not be satisfactory. It has been found that certain commercially available foils having a hardness in the range of 15-25 on the Rockwell C scale provide the optimal characteristics described herein.

Another important characteristic of the material of foils 53, 57 is its corrosion resistance. This is for the same reason that inner foil 51 must have a high corrosion resistance. Expansion joints of the type disclosed herein are particularly suitable for use in flue ducts of power plants, and the gases to which such expansion joints are subjected certain very highly corrosive chemicals.

To meet all the foregoing requirements and to provide the optimum flexure characteristics as discussed above, it has been found that the high nickel alloys containing more than 50% nickel are the most suitable. These alloys usually also contain chromium, among other metals as major alloy constituents. An especially suitable alloy in this regard is Haselloy C-276. Other alloy metals which can be used are Inconel 600 and Inconel 625.

It will be understood that outer foil 53 is substantially completely bonded or affixed to first layer 45 of heat resistant material so that the resulting first foil-fabric composite 55 acts as an integral piece. The same is true of the bonding of foil 57 to second layer 47 of heat resistant material to form second foil-fabric composite 59. This is not true, however, of inner foil 51. Inner foil 51 is essentially unaffixed to surrounding foil-fabric composites 55, 59. This is important to ensure adequate flexibility of fabric portion 7 of the expansion joint. As the fabric portion 7 flexes during use, first and second foil-fabric composites 55, 59 and barrier 51 are able to move relative to each other. To prevent this movement by bonding or affixing all of the layers together would result in an unacceptable rigidity of the fabric portion 7.

Of course, there will be at least a minor degree of affixing of all the layers together such as where the overall fabric portion 7 is sewn together at edges 49 and where it is clamped to the frame sections 3 and 5 by retainers 9 and 11. It may also be possible to provide for affixing of inner foil 51 to the first and second foil-fabric composites 55, 59 at other locations, but it is important that at least the major portion of the surface area of inner foil 51 is unaffixed to the first and second foil-fabric composites 55, 59.

In addition to the advantageous flexure characteristics provided by the foil-fabric composites 55, 59, they also provide important advantages in terms of increased durability and life of fabric portion 7 of the expansion joint. In previously known constructions, the outer layer of flexible material of fabric portion 7 which faces the interior passageway 12—whether it be woven glass cloth, an ultra-thin vapor deposited layer of aluminum on the glass cloth, or another type of material—must be protected against erosion due to the constant impingement of hot, dirty gases flowing at high velocity and containing high amounts of particulate matter. Gases of this type are particularly prevalent in power plant flue ducts. The protection of the fabric portion of the joint is normally accomplished through use of a rigid erosion shield of the type shown in applicant's aforementioned copending application Ser. No. 932,613 filed Aug. 10, 1978. During flexure of the expansion joint and accompanying folding, bunching or bowing of the flexible material of the joint, pockets are formed between the erosion shield and the material of the expansion joint. These pockets tend to become filled with ash and soot. When the expansion joint returns to its undeflected position, the ash or soot becomes packed between the flexible material of the fabric portion 7 and the erosion shield, and this tears and damages the material of the fabric portion 7, including the inner foil 51.

Outer foil 53, which is exposed to the interior of the passageway 12 eliminates the need for the erosion shield. A foil 53 of the type disclosed herein is sufficiently hard, thick, and strong to withstand the constant impingement of the high velocity gases containing particulate matter. The elimination of the erosion shield not only simplifies the construction of the expansion joint, it also overcomes the serious problems discussed above.

Outer foil 57 which faces the exterior of the expansion joint also provides advantages other than the important advantage of special flexure characteristics. In particular, foil 57 helps to avoid problems of damage to the expansion joint by sand blasting when the equipment is cleaned, and it also helps to avoid accidental damage from the exterior of the expansion joint such as by objects or pieces of equipment inadvertently coming into contact or impacting with the expansion joint.

Figure 8:
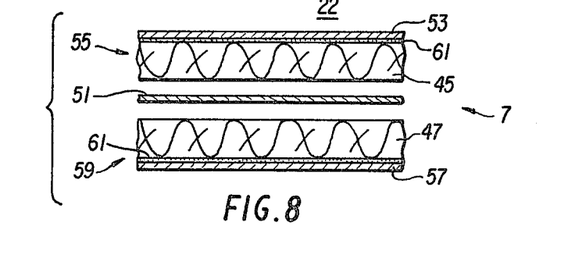
FIG. 8 is an enlarged, fragmentary, exploded, cross-sectional view of the flexible fabric material utilized in the invention depicting one manner of affixing the outer metallic foils to the layers of heat resistant material.

The manner of bonding or affixing each outer foil 53, 59 to its respective layer 45, 47 of heat resistant material will now be described. Referring to FIG. 8, each outer foil 53, 57 may be bonded to the woven glass cloth of its respective layer of heat resistant material 45, 47 by an adhesive layer 61 of high temperature cement having an epoxy base. Such a bonding method has been used in a prototype of the present invention, and it has been found satisfactory in terms of providing the optimum flexure characteristics. Such a bonding method permits temperatures outside the fabric of up to approximately 400° F., and this is satisfactory for many applications. It is, however, desirable to provide a construction which can withstand higher temperatures.

Figure 9:
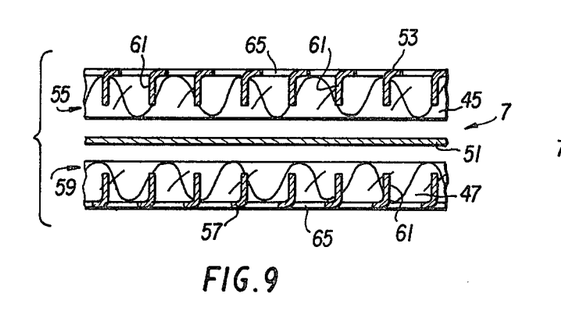
FIG. 9 is an enlarged, fragmentary, exploded sectional view of the flexible fabric material utilized in the present invention and, in particular, depicting another method of attachment of the outer metallic foils to the layers of heat resistant material.
Figure 10:
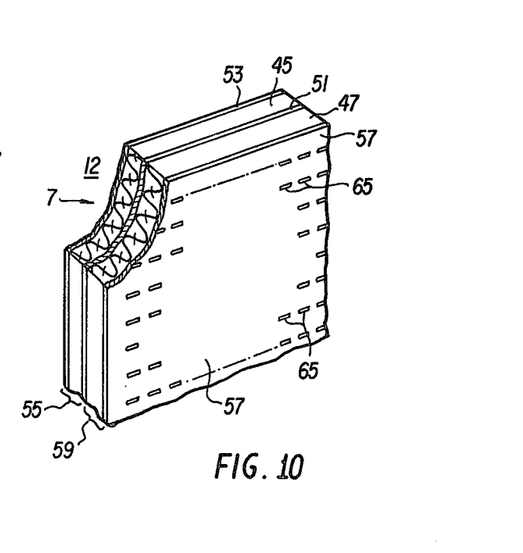
FIG. 10 is an enlarged, fragmentary perspective view of the material of FIG. 9.

In this latter regard, FIGS. 9 and 10 illustrate a construction wherein the outer foils 53, 57 are mechanically bonded to the woven glass cloth of layers 45, 47. This is accomplished by a plurality of metal "whiskers" 61 punched into the outer foils 53, 57 and extending into the interstices of the woven glass cloth which constitutes the temperature resistant material of each layer 45, 47. In particular, whiskers 61 are punched into outer foils 53, 57 from the outside by a roll-type punching die, and the punching takes place with the glass cloth of layer 45 or 47 in immediate juxtaposition to foil 53 or 57. Thus, as apertures 65 (FIG. 10) are punched into each outer foil by the die, the whiskers 63 formed thereby immediately become entangled in the glass cloth to create a mechanical bond.

Another alternative which has been considered for affixing foils 53, 57 to their respective layers, 45, 47 of heat resistant material is growing of crystalline whiskers on foils 53, 57, such as disclosed in U.S. Pat. No. 3,808,087 issued Apr. 30, 1974. The crystalline whiskers would then be used to effect mechanical bonding in a manner similar to that described above. Yet another type of bonding which has been considered is coating or depositing a material having the characteristics similar to those of foils 53, 57 on layers 45, 47 of heat resistant material. As indicated earlier, however, vapor deposition methods known to the applicant, particularly aluminum vapor deposition methods, are not presently considered feasible for achieving the desired results.

While it has been indicated that the first and second layers 45, 47 of high temperature resistant material or heat resistant material are preferably constructed of woven, fiberglass cloth, other materials may be used. Essential characteristics of the material is that it be flexible and drapeable, that it be capable of being subject to high temperatures, e.g. temperatures up to 700° or 800° F., and that it maintain a substantial extent of its tensile strength at such high temperatures. As indicated earlier, the woven fiberglass cloth used in the preferred embodiment maintains approximately 50% of its tensile strength at 700°. The material used for layers 45, 47 will generally be non-metallic and a heat insulating material. Generally, too, it will be a woven material.

Figure 11:
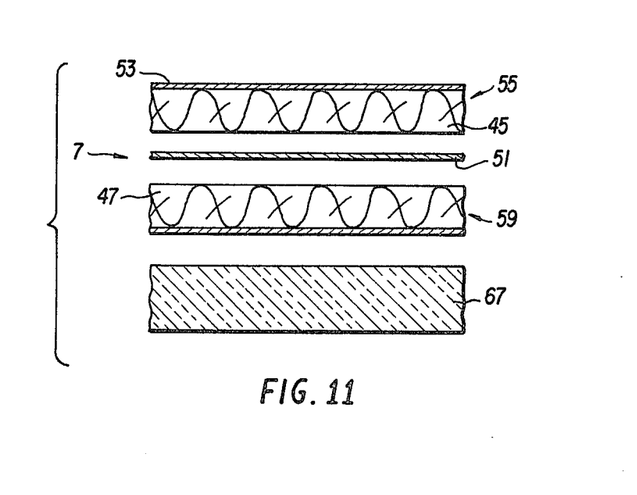
FIG. 11 is an enlarged, fragmentary, exploded sectional view depicting the flexible fabric material utilized in the present invention and, in particular, depicting the use of an additional layer of material on one side of the fabric material.

Aside from layers 45, 47, 51, 53 and 57, the material of fabric portion 7 may include additional layers. For instance, the fabric portion 7 may include an additional outer layer 67 of insulating material disposed exteriorly of foil 57 to help prevent loss of heat into the power plant and to protect against possible injury to workers. Layer 67 would also help provide additional protection against damage to the fabric portion 7 from the exterior. Further, it is possible to include additional layers than those specifically shown herein, such as a layer of insulating material between the two foil-fabric composites 55, 59. For instance, a layer of mineral wool could be used therebetween in the manner shown in aforementioned copending application Ser. No. 932,613.

Figure 7:
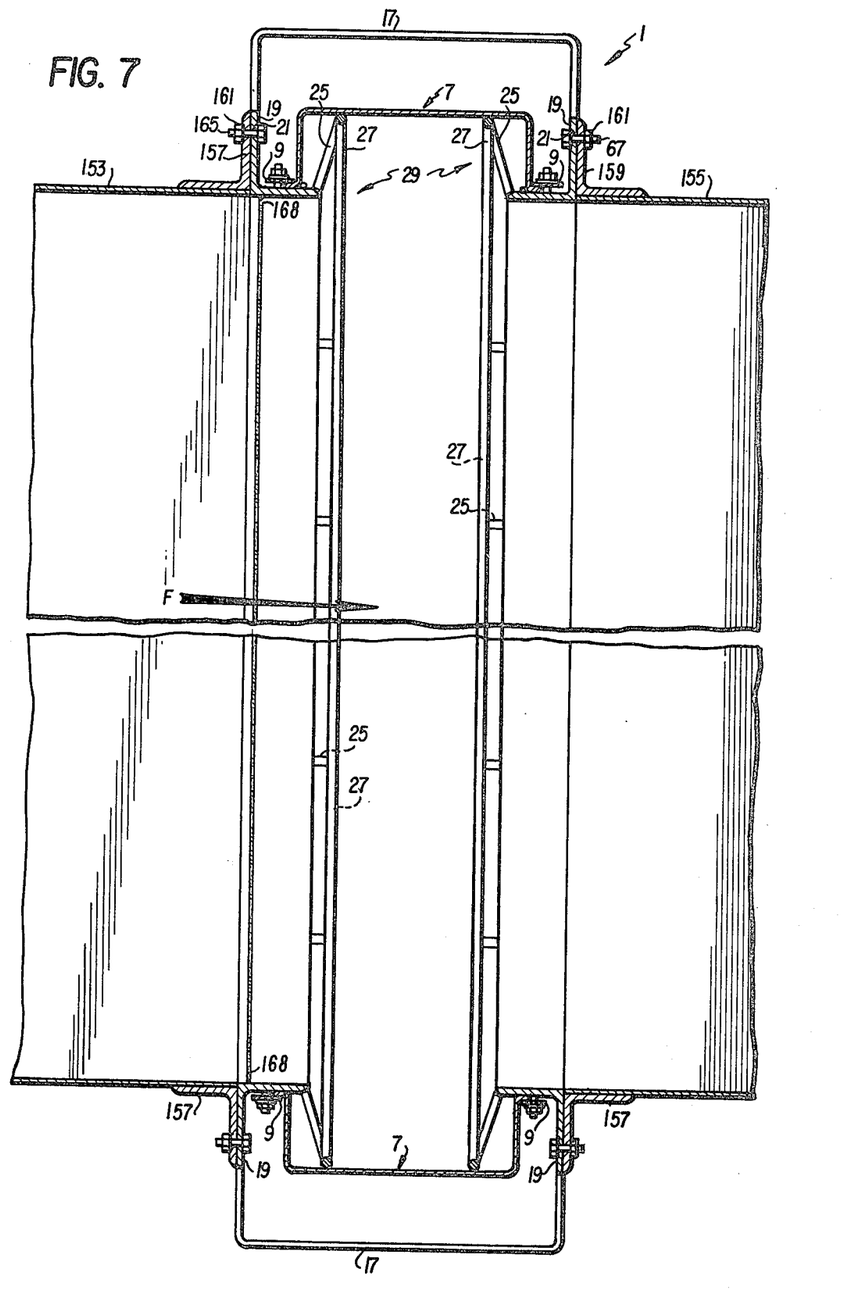
FIG. 7 is a vertical cross-sectional view of the expansion joint taken along the line 7—7 of FIG. 1 and shown installed in a duct system.

One manner in which expansion joint 1 may be installed within a duct or conduit system shall now be described with reference to FIG. 7. Bars 17 are utilized for presetting and aligning joint 1 between adjacent ends of ducts 153 and 155, after which bars 17 may be removed from joint 1 as previously indicated. Angle sections 19 are secured to corresponding faces of similar angle sections 157 and 159 provided on the ends of ducts 153 and 157, respectively. This is achieved by utilizing a plurality of nut and bolt assemblies 161 which are secured through apertures 21 provided in sections 19 and corresponding apertures 165 and 167 provided in sections 157 and 159, respectively. Fabric portion 7, being of a sleeve-like configuration, is supported around the outer surfaces of support frames 29, with the peripheral edges of fabric portion 6 being securely attached against angle sections 19 by means of retainers 9 and 11 as previously described. It is therefore apparent that movement of ducts 153 and 155 longitudinally or traversely of the direction of fluid flow as indicated by arrow F is accommodated by the flexible nature of fabric portion 7.

While the expansion joint of the preferred embodiment has been described in connection with the joining together of two conduits or two conduit sections, it will be understood that the invention is not limited to expansion joints used in this context. The present invention may be used in connection with any type of expansion joint for accommodating relative movements between a plurality of elements through which a fluid flows. For instance, an expansion joint according to the present invention may be used in connection with a joint between a conduit and an aperture in a wall, such as the expansion joint of FIGS. 8 and 9 of applicant's aforementioned copending application Ser. No. 932,613.

It will again be seen that the construction of an expansion joint according to the present invention, particularly with respect to the specific structural configuration of the fabric portion, provides a greatly simplified and very durable flexible joint while at the same time providing an effective seal against gas leakage and providing a joint for use in high temperature applications and severely corrosive atmospheres. The foil-fabric composites, in particular, provide optimal flexure characteristics to protect against damage and rupture of the fabric assembly, particularly the inner foil barrier thereof, due to crumpling or creasing as a result of excessive deformation of the fabric. The outer foils which are bonded to the glass cloth also provide additional protection in their own right. The outer foil which faces toward the passageway 12 both eliminates the need for an erosion shield and overcomes durability problems caused by collection of ashes and soot in pockets between the expansion joint fabric and the erosion shield. The other outer foil protects against damage from the exterior of the expansion joint.

It will be understood that the fabric portion 7 according to the present invention, despite some degree of stiffening, remains a flexible, foldable material. That is, fabric portion 7 is not a load bearing or load carrying element.

It is to be understood that the embodiments of the invention herewith shown and described are to be taken as preferred examples of the same, and that various changes in the shapes, size and arrangement of parts and compositions may be resorted to, without departing from the spirit of the invention or scope of the subjoined claims.

What is claimed is:

1. An expansion joint for accommodating relative movements between a plurality of elements through which a fluid flows, the joint comprising:
   (a) a flexible fabric portion defining an enclosed passage through which fluid may flow;
   (b) first means for attaching said fabric portion to one of the elements through which the fluid flows;
   (c) second means for attaching said fabric portion to another of the elements through which the fluid flows;
   (d) said fabric portion extending between said first and second attaching means, said fabric portion including:
      (1) a first layer of high temperature resistant material;
      (2) a second layer of high temperature resistant material;
      (3) an inner metallic foil disposed between said first and second layers of high temperature resistant material;
      (4) means for preventing creasing and rupture of said inner metallic foil, due to excessive folding and wrinkling of said fabric portion, by partially stiffening said layers of heat resistant material to such an extent that said excessive folding and wrinkling is prevented but not to such extent that relative movement between the plurality of elements is hampered; and
      (5) said preventing means including a first metallic foil, other than said inner metallic foil, affixed to said first layer of high temperature resistant material to provide a first foil-fabric composite and a second metallic foil, other than said inner metallic foil, affixed to said second layer of high temperature resistant material to provide a second foil-fabric composite, said first and second metallic foils each having a thickness greater than 0.0005 inches.

2. An expansion joint as defined in claim 1 wherein said first foil-fabric composite is so disposed that said first metallic foil faces inwardly with respect to said passage defined by said fabric portion and said second foil-fabric composite is so disposed that said second metallic foil faces outwardly with respect to said passage defined by said fabric portion.

3. An expansion joint as defined in claim 1 wherein said first and second metallic foils are affixed, respectively, to said first and second high temperature resistant materials by an adhesive.

4. An expansion joint as defined in claim 1 wherein said high temperature resistant material of said first and second layers is a woven fiberglass cloth.

5. An expansion joint as defined in claim 4 wherein said first and second metallic foils are affixed, respectively, to said first and second layers of high temperature resistant material by whiskers punched into the foil and extending through the interstices of said woven fiberglass cloth comprising the temperature resistant material of each layer.

6. An expansion joint as defined in claim 1 including an additional layer of material disposed outwardly of said second metallic foil of said second foil-fabric composite.

7. An expansion joint as defined in claim 1 wherein said first and second metallic foils each has a thickness falling in the range of 0.001 to 0.003 inches.

8. An expansion joint as defined in claim 1 wherein said first, second and inner metallic foils comprise a super alloy metal having more than approximately 50% nickel and including chromium.

9. An expansion joint as defined in claim 8 wherein said first and second metallic foils both are of a hardness in the range of 15-25 on the Rockwell C scale.

10. An expansion joint for accommodating relative movements between a plurality of elements through which a fluid flows, the joint comprising:
  (a) a flexible fabric portion defining an enclosed passage through which fluid may flow:
  (b) first means for attaching said fabric portion to one of the elements through which the fluid flows;
  (c) second means for attaching said fabric portion to another of the elements through which the fluid flows;
  (d) said fabric portion extending between said first and second attaching means, said fabric portion including:
    (1) a first layer of high temperature resistant material;
    (2) a second layer of high temperature resistant material;
    (3) an inner metallic foil disposed between said first and second layers of high temperature resistant material;
    (4) means for preventing creasing and rupture of said inner metallic foil due to excessive folding and wrinkling of said fabric portion, by partially stiffening said layers of heat resistant material to such an extent that said excessive folding and wrinkling is prevented but not to such extent that relative movement between the plurality of elements is hampered; and
    (5) said preventing means including a first metallic foil, other than said inner metallic foil, affixed to said first layer of high temperature resistant material to provide a first foil-fabric composite and a second metallic foil, other than said inner metallic foil, affixed to said second layer of high temperature resistant material to provide a second foil-fabric composite, said first and second metallic foils each being of a hardness in the range of 15-20 on the Rockwell C scale.

11. An expansion joint as defined in claim 10 wherein said first foil-fabric composite is so disposed that said first metallic foil faces inwardly with respect to said passage defined by said fabric portion and said second foil-fabric composite is so disposed that said second metallic foil faces outwardly with respect to said passage defined by said fabric portion.

12. An expansion joint as defined in claim 10 wherein said high temperature resistant material of said first and second layers is a woven fiberglass cloth.

13. An expansion joint as defined in claim 10 wherein said first and second metallic foils both have thicknesses greater than 0.0005 inches.

14. An expansion joint as defined in claim 13 wherein said first and second metallic foils each has a thickness falling in the range of 0.001 to 0.003 inches.

15. An expansion joint as defined in claim 10 wherein said first, second, and inner metallic foils comprise a super alloy metal having more than approximately 50% nickel and including chromium.

16. A flexible fabric material comprising:
  (a) a first layer of flexible high temperature resistant material;
  (b) a second layer of flexible high temperature resistant material, said first and second layers of flexible high temperature resistant material being disposed in adjacent, parallel relationship;
  (c) an inner metallic foil disposed between said first and second layers of high temperature resistant material, the major portion of the surface area of said inner metallic foil being unaffixed to said first and second layers of high temperature resistant materials;
  (d) means for preventing creasing and rupture of said inner metallic foil, due to excessive folding and wrinkling of said fabric portion, by partially stiffening at least one of said layers of heat resistant material to such an extent that said excessive folding and wrinkling is prevented but not to such extent that relative movement between the plurality of elements is hampered; and
  (e) said preventing means including a first metallic foil, other than said inner metallic foil, affixed to said first layer of high temperature resistant material to provide a first foil-fabric composite and a second metallic foil, other than said inner metallic foil, affixed to said second layer of high temperature resistant material to provide a second foil-fabric composite, said first and second metallic foils each having a thickness greater than 0.0005 inches.

17. A flexible fabric material as defined in claim 16 wherein said first and second foil-fabric composites are so disposed that said first and second metallic foils thereof face outwardly of each other in opposite directions and such that said first and second layers of high temperature resistant material are disposed between said first and second metallic foils.

18. A flexible fabric material as defined in claim 17 including an additional layer of material disposed outwardly of said second metallic foil of said second foil-fabric composite.

19. A flexible fabric material as defined in claim 16 wherein said first and second metallic foils are affixed, respectively, to said first and second temperature resistant materials by adhesive.

20. A flexible fabric material as defined in claim 16 wherein said high temperature resistant material of said first and second layers is a woven fiberglass cloth.

21. An flexible fabric material as defined in claim 20 wherein said first and second metallic foils are affixed, respectively, to said first and second layers of high temperature resistant material by whiskers punched into the foil and extending into the interstices of the woven fiberglass cloth comprising the temperature resistant material of each layer.

22. A flexible fabric material as defined in claim 16 wherein said first and second metallic foils each has a thickness falling in the range of 0.001 to 0.003 inches.

23. A flexible fabric material as defined in claim 16 wherein said first, second and inner metallic foils comprise a super alloy metal having more than approximately 50% nickel and including chromium.

24. A flexible fabric material as defined in claim 23 wherein said first and second metallic foils both are of a hardness in the range of 15-25 on the Rockwell C scale.

25. A flexible fabric material comprising:
 (a) a first layer of flexible high temperature resistant material;
 (b) a second layer of flexible high temperature resistant material, said first and second layers of high temperature resistant material being disposed in adjacent, parallel relationship;
 (c) an inner metallic foil disposed between said first and second layers of high temperature resistant material, the major portion of the surface area of said inner metallic foil being unaffixed to said first and second layers of high temperature resistant material;
 (d) means for preventing creasing and rupture of said inner metallic foil, due to excessive folding and wrinkling of said fabric portion, by partially stiffening at least one of said layers of heat resistant material to such an extent that said excessive folding and wrinkling is prevented but not to such extent that relative movement between the plurality of elements is hampered; and
 (e) said preventing means including a first metallic foil, other than said inner metallic foil, affixed to said first layer of high temperature resistant material to provide a first foil-fabric composite and a second metallic foil, other than said inner metallic foil, affixed to said second layer of high temperature resistant material to provide a second foil-fabric composite, said first and second metallic foils each being of a hardness in the range of 15-20 on the Rockwell C scale.

26. A flexible fabric material as defined in claim 25 wherein said first and second foil-fabric composites are so disposed that said first and second metallic foils thereof face outwardly of each other in opposite directions and such that said first and second layers of high temperature resistant material are disposed between said first and second metallic foils.

27. An expansion joint as defined in claim 26 wherein said high temperature resistant material of said first and second layers is a woven fiberglass cloth.

28. An expansion joint as defined in claim 26 wherein said first and second foils both have thicknesses greater than 0.0005 inches.

29. An expansion joint as defined in claim 28 wherein said first and second metallic foils each has a thickness falling in the range of 0.001 to 0.003 inches.

30. An expansion joint as defined in claim 26 wherein said first, second and inner metallic foils comprise a super alloy metal having more than approximately 50% nickel and including chromium.

* * * * *